(12) United States Patent
Porcino

(10) Patent No.: US 6,831,953 B2
(45) Date of Patent: Dec. 14, 2004

(54) METHOD OF, AND A RADIO TERMINAL FOR, DETECTING THE PRESENCE OF A 2-FSK SIGNAL

(75) Inventor: Domenico G. Porcino, Horley (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 693 days.

(21) Appl. No.: 09/801,631

(22) Filed: Mar. 8, 2001

(65) Prior Publication Data

US 2001/0026598 A1 Oct. 4, 2001

(30) Foreign Application Priority Data

Mar. 9, 2000 (GB) .............................................. 0005592

(51) Int. Cl.⁷ .............................................. H04L 5/12
(52) U.S. Cl. ...................... 375/261; 375/272; 375/334; 329/302; 455/226.2; 455/226.4
(58) Field of Search ................................ 375/261, 272, 375/316, 324, 334, 340; 329/300, 302; 327/39, 50, 56; 455/226.1, 226.2, 226.4

(56) References Cited

U.S. PATENT DOCUMENTS

| | | | | |
|---|---|---|---|---|
| 4,423,519 A | * | 12/1983 | Bennett et al. | 375/324 |
| 5,553,099 A | * | 9/1996 | Carroll et al. | 375/334 |
| 6,297,691 B1 | * | 10/2001 | Anderson et al. | 329/300 |
| 6,408,035 B1 | * | 6/2002 | Van Den Enden et al. | 375/334 |

OTHER PUBLICATIONS

International Search Report of PCT/ EP01/01201.*

* cited by examiner

Primary Examiner—Dac V. Ha
(74) Attorney, Agent, or Firm—Aaron Waxler

(57) ABSTRACT

A method of, and terminal for, detecting the presence of a 2-FSK signal, the method comprising receiving (10) a 2-FSK signal, quadrature frequency down-converting (34, 35, 36) the received signal to produce quadrature related outputs, oversampling (42, 43) the quadrature related outputs to produce digital samples, differentially decoding (44) the digital samples to produce real and imaginary components, integrating (56, 58) the imaginary components and comparing (26) the integrated value with a fixed threshold value (24) and determining a signal to be present if the threshold is exceeded.

5 Claims, 1 Drawing Sheet

METHOD OF, AND A RADIO TERMINAL FOR, DETECTING THE PRESENCE OF A 2-FSK SIGNAL

The present invention relates to a method of, and radio terminal for, detecting the presence of a 2-FSK signal. The radio terminal may typically be a telemetry module or part thereof for use in remote monitoring applications such as automatic water metering.

Telemetry modules are installed in equipment which may be continuously in use for many years without being serviced. In the case of battery powered telemetry modules it is desirable for them to operate for up to 10 years between battery replacements. To be able to achieve such long service lives the telemetry modules operate in accordance with a protocol facilitating current saving whilst giving an adequate response time. Protocols achieving these objectives are well known in various technical fields such as digital paging in which the CCIR Radiopaging Code No. 1, alternatively known as POCSAG, has been in use for nearly 20 years. The general approach followed is that the radio unit "sleeps" for long periods of time but wakes up periodically to check if there are any data signals being transmitted on its channel. The wake-up period may be preset independently of whether or not signals are present. In a refinement of this type of battery economy protocol, when the radio unit has been woken-up, it checks for the presence of data before energising the entire receiver and if none is detected within a period of time which is shorter than the preset period, it powers down prematurely. Consequently battery life may be extended or a smaller sized battery used with the same electronic device.

Figure 1:
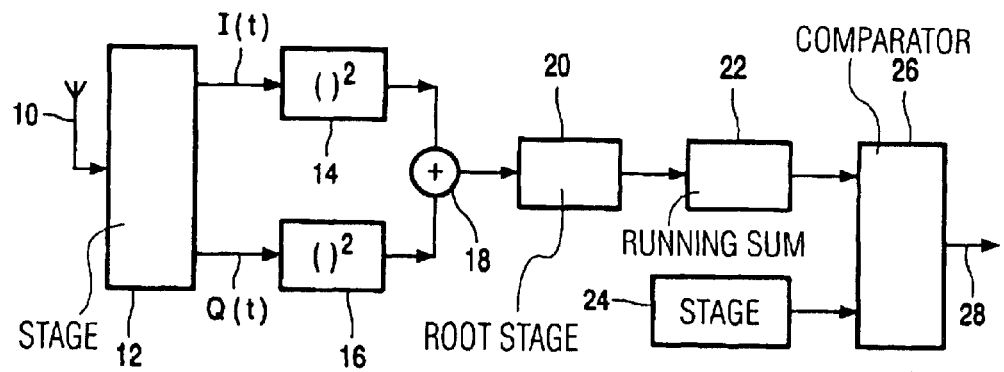

If the radio unit is unreliable in detecting data then firstly there is a probability of a false alarm (P (false alarm) or P(fa) for short) which is defined as the probability that a signal is "detected" by a data presence detector, even when only noise is present, and secondly there is a probability of false dismissal (P(false dismissal) or P(fd) in short) which is defined as the probability that the data presence detector rejects a good signal and takes it for noise. P(fd) is a more critical parameter because every single false dismissal of data will cause a complete loss of a packet. Typical system requirements are: $P(fa) \leq 1\%$ and $P(fd) \leq 0.1\%$ A block schematic diagram of a typical data presence indicator is shown in FIG. 1 of the accompanying drawings. In FIG. 1 a signal received by an antenna 10 is frequency down converted in an r.f. front end stage 12. The stage 12 comprises a quadrature frequency down conversion stage which provides a real output I(t) and an imaginary output Q(t) at a zero IF or low IF. These outputs are applied to respective squaring circuits 14, 16 which produce outputs $I(t)^2$ and $Q(t)^2$, respectively. These signals are summed in a stage 18 and the square root of the sum is derived in a square root stage 20. The output $$P(t)\left( = \sqrt{I(t)^2 + Q(t)^2} \right)$$

is applied to a running sum stage 22. The running sum from the stage 22 is compared with a fixed threshold value generated by a stage 24 in a comparator 26, an output 28 from which comprises a data presence indication.

The main purpose of the illustrated indicator circuit is to distinguish a signal from noise. A drawback to this known circuit is that any factors present which reduce the distinctiveness of the signal relative to noise will slow down the detection mechanism rendering it less economical from a power consumption point of view.

An object of the present invention is to optimise the detection of the data presence for the shortest possible time that guarantees the minimum reliability required whilst minimising the energy requirements.

According to one aspect of the present invention there is provided a method of detecting the presence of a 2-FSK signal, the method comprising receiving a 2-FSK signal, quadrature frequency down-converting the received signal to produce quadrature related outputs, oversampling the quadrature related outputs to produce digital samples, differentially decoding the digital samples to produce real and imaginary components, integrating the imaginary components and comparing the integrated value with a fixed threshold value and determining a signal to be present if the threshold is exceeded.

According to another aspect of the present invention there is provided a radio terminal comprising means for receiving a 2-FSK signal, a quadrature frequency down converting means having an input coupled to the signal receiving means and outputs for quadrature related signals, decoding means for decoding the quadrature related signals to produce real and imaginary components, means for integrating the imaginary components, comparison means having a first input coupled to receive an output from the integrating means, a second input coupled to a threshold generating circuit and an output for providing a signal presence indication when the output from the integrating means exceeds a value produced by the threshold generating circuit.

The present invention is based on enhancing the signal relative to noise by reducing the addition of pure noise to a data presence indicator thereby increasing the speed of determining the presence of a signal without reducing the level of reliability. The speed increase may be up to 9 times faster. Therefore if no signal is present the terminal may be deactivated sooner, thus enhancing the battery life.

In the case of 2-FSK modulated transmissions the constellation of decoded signals lies totally on the imaginary branch. Thus integrating data registered on the real branch, which data is similar to pure noise, will not be beneficial.

Figure 2:
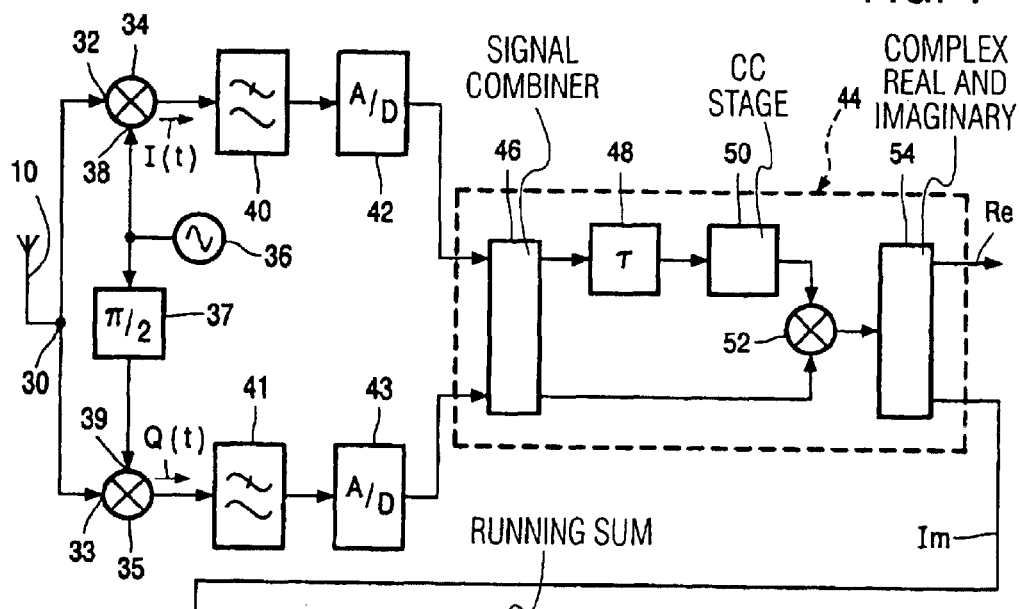
Figure 3:
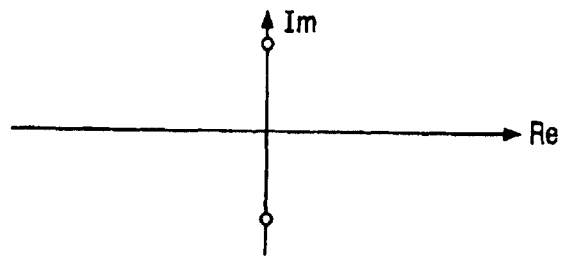

The present invention will now be explained and described, by way of example, with reference to the accompanying drawings, wherein:

FIG. 1 is a block schematic diagram of a known data presence indicator circuit described in the preamble of the present specification, FIG. 2 is a block schematic diagram of a data presence indicator circuit made in accordance with the present invention, and FIG. 3 represents a constellation of 2-FSK demodulated data.

In the drawings the same reference numerals have been used to represent corresponding features.

The receiver shown in FIG. 2 may be an independent receiver or the receiver section of a transceiver embodied in a telemetry module. For convenience both arrangements will be described as a receiver.

The receiver operates in accordance with a battery economising protocol whereby it is periodically woken-up from a sleep mode in which only those parts of the receiver essential to maintaining the receiver functional in its sleep state are energised.

An antenna 10 is coupled to a signal splitter 30 which supplies an input signal to first inputs 32, 33 of mixers 34, 35. A local oscillator 36 is coupled to a second input 38 of the mixer 34 and, by way of a quadrature phase shifter 37, to a second input 39 of the mixer 35. The frequency of the local oscillator 36 is selected to translate the signal received at the antenna 10 down to either a zero IF or low IF. The output from the mixer 34 is designated the in-phase signal I(t) and the output from the mixer 35 is designated the quadrature phase signal Q(t).

The in-phase and quadrature phase signals I(t) and Q(t) are respectively filtered and digitised in low pass filters 40, 41 and analogue to digital converters (ADC) 42, 43. The ADCs 42, 43 oversample the signals I(t) and Q(t) and the samples are applied to a differential decoder 44. For example if the data rate is 150 bits/s and the sampling frequency is 76.8 kHz, the oversampling rate is 512 samples per bit. The differential decoder 44 is of a known design and comprises a complex signal combiner 46 having a first output coupled by way of a delay stage 48 and a complex conjugate stage 50 to a first input of a multiplier 52 and a second output coupled directly to a second input of the multiplier 52. An output of the multiplier 52 is applied to a complex real and imaginary stage 54 which supplies a real output Re and an imaginary output Im, both at the oversampled rate.

Referring to FIG. 3 for a moment, the main aim of a data presence indicator circuit (DPI) to be described is to distinguish signal from noise. In order to make the DPI circuit more efficient in the case of 2-FSK modulated transmissions the information available on the constellation expected for the demodulated digital signal is used. As shown in FIG. 3 the constellation of the decoded signals lies entirely on the imaginary branch Im. Therefore integrating the data registered on the real branch Re, which is similar to pure noise, is not beneficial insofar as 2-FSK is concerned. By neglecting the contribution from the real branch, the speed of the detection process is increased by between 2 and 8.5 times compared to the known method described with reference to FIG. 1.

Referring back to FIG. 2, the oversampled imaginary output Im is supplied to the DPI circuit, more specifically to an absolute value stage 56. The output from the stage 56 is integrated in a running sum stage 58. An output from the stage 58 is applied to a first input of a comparator 26 in which it is compared with a fixed threshold voltage generated in a threshold stage 24. If the running sum exceeds the threshold voltage a data presence indication is provided on an output 28, but if the threshold voltage is not exceeded then the comparator 26 times out.

Not only is the circuit shown in FIG. 2 faster than known circuits but also it has been calculated that up to 2 and a half years of additional battery life can be gained exclusively from the data presence indicator circuit.

Optionally the circuit includes frequency compensation algorithms which can reduced the sensitivity to frequency offsets and prevent the constellation of signals from rotating, transferring part of the data on the real path.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of receivers having a data presence indicator stage and component parts of or in addition to features already described herein.

What is claimed is:

1. A method of detecting the presence of a 2-FSK signal, the method comprising receiving a 2-FSK signal, quadrature frequency down-converting the received signal to produce quadrature related outputs, oversampling the quadrature related outputs to produce digital samples, differentially decoding the digital samples to produce real and imaginary components, integrating the imaginary components and comparing the integrated value with a fixed threshold value and determining a signal to be present if the threshold is exceeded.

2. A method as claimed in claim 1, characterised in that the imaginary components are integrated by deriving the absolute values of the imaginary components and forming a running sum of the absolute values, the running sum being compared with the fixed threshold.

3. A radio terminal comprising means for receiving a 2-FSK signal, a quadrature frequency down converting means having an input coupled to the signal receiving means and outputs for quadrature related signals, decoding means for decoding the quadrature related signals to produce real and imaginary components, means for integrating the imaginary components, comparison means having a first input coupled to receive an output from the integrating means, a second input coupled to a threshold generating circuit and an output for providing a signal presence indication when the output from the integrating means exceeds a value produced by the threshold generating circuit.

4. A radio terminal as claimed in claim 3, characterised in that an absolute value determining stage is coupled to the integrating means and in that the integrating means comprises means for producing a running sum of outputs of the absolute value determining stage.

5. A telemetry module including a receiver as claimed in claim 3 or 4.

* * * * *